US012592456B2

(12) United States Patent
Muratsu et al.

(10) Patent No.: US 12,592,456 B2
(45) Date of Patent: Mar. 31, 2026

(54) ELECTRIC POWER STORAGE MODULE

(71) Applicant: Panasonic Intellectual Property Management Co., Ltd., Osaka (JP)

(72) Inventors: Jiro Muratsu, Okayama (JP); Hirotaka Ogino, Osaka (JP); Hiroshi Takasaki, Osaka (JP); Tatsuya Hirano, Osaka (JP); Keisuke Nagata, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 557 days.

(21) Appl. No.: 18/017,789

(22) PCT Filed: Jul. 21, 2021

(86) PCT No.: PCT/JP2021/027247
§ 371 (c)(1),
(2) Date: Jan. 24, 2023

(87) PCT Pub. No.: WO2022/024893
PCT Pub. Date: Feb. 3, 2022

(65) Prior Publication Data
US 2023/0344089 A1      Oct. 26, 2023

(30) Foreign Application Priority Data

Jul. 31, 2020      (JP) ................................. 2020-130360

(51) Int. Cl.
*H01M 50/107*          (2021.01)
*H01M 50/152*          (2021.01)
(Continued)

(52) U.S. Cl.
CPC ....... *H01M 50/507* (2021.01); *H01M 50/107* (2021.01); *H01M 50/152* (2021.01);
(Continued)

(58) Field of Classification Search
CPC ............. H01M 50/107; H01M 50/152; H01M 50/545; H01M 50/55; H01M 50/559
See application file for complete search history.

(56) References Cited

U.S. PATENT DOCUMENTS

| | | |
|---|---|---|
| 2013/0273398 A1 | 10/2013 | Hoshi et al. |
| 2020/0176735 A1 | 6/2020 | Muratsu et al. |
| 2020/0395587 A1 | 12/2020 | Ryu et al. |
| 2023/0307773 A1* | 9/2023 | Muratsu ............. H01M 50/202 |

FOREIGN PATENT DOCUMENTS

| | | |
|---|---|---|
| CN | 103378326 A | 10/2013 |
| CN | 110651379 A | 1/2020 |
| | (Continued) | |

OTHER PUBLICATIONS

The EPC Office Action dated Dec. 22, 2023 for the related European Patent Application No. 21851120.2.

(Continued)

*Primary Examiner* — Kevin E Yoon
(74) *Attorney, Agent, or Firm* — Rimon P.C.

(57)          ABSTRACT

A power storage module includes: at least one cylindrical power storage device; and an upper holder that holds an upper end side of the power storage device; in which a positive-electrode terminal and a negative-electrode terminal are disposed at an end part on the upper end part of the power storage device, the negative-electrode terminal is disposed outside the positive-electrode terminal in a radial direction of the power storage device, the power storage module further includes a negative electrode lead connected to the negative-electrode terminal from an outer side in the radial direction, and the upper holder includes a restricting part located inside at least a part of the lead in the radial direction.

12 Claims, 10 Drawing Sheets

(51) Int. Cl.

| | |
|---|---|
| *H01M 50/188* | (2021.01) |
| *H01M 50/213* | (2021.01) |
| *H01M 50/291* | (2021.01) |
| *H01M 50/507* | (2021.01) |
| *H01M 50/545* | (2021.01) |
| *H01M 50/55* | (2021.01) |
| *H01M 50/559* | (2021.01) |

(52) U.S. Cl.
CPC ....... *H01M 50/188* (2021.01); *H01M 50/213* (2021.01); *H01M 50/291* (2021.01); *H01M 50/545* (2021.01); *H01M 50/55* (2021.01); *H01M 50/559* (2021.01)

(56) References Cited

FOREIGN PATENT DOCUMENTS

| | | | | |
|---|---|---|---|---|
| EP | 2650946 | A1 | 10/2013 | |
| EP | 3637494 | A1 | 4/2020 | |
| JP | 2020-518976 | A | 6/2020 | |
| WO | WO-2017062886 | A1 * | 4/2017 | .......... H01M 50/502 |
| WO | 2019/058938 | A1 | 3/2019 | |

OTHER PUBLICATIONS

International Search Report issued in International Patent Application No. PCT/JP2021/027247, dated Oct. 12, 2021, with English translation.
English Translation of Chinese Office Action dated Jun. 28, 2025 for the related Chinese Patent Application No. 202180059138.7.

\* cited by examiner

FIG. 2

ELECTRIC POWER STORAGE MODULE

CROSS-REFERENCE OF RELATED APPLICATIONS

This application is the U.S. National Phase under 35 U.S.C. § 371 of International Patent Application No. PCT/JP2021/027247, filed on Jul. 21, 2021, which in turn claims the benefit of Japanese Patent Application No. 2020-130360, filed on Jul. 31, 2020, the entire disclosures of which applications are incorporated by reference herein.

TECHNICAL FIELD

The present disclosure relates to a power storage module.

BACKGROUND ART

Conventionally, a power storage module is known as a power source including a plurality of power storage devices. For example, the power storage module disclosed in PTL 1 includes a plurality of cylindrical batteries. In this cylindrical battery, a sealing body is configured as a positive-electrode terminal, an outer covering can is configured as a negative-electrode terminal, and a negative electrode lead is joined to a shoulder portion (swaged opening end portion) of the outer covering can.

CITATION LIST

Patent Literature

PTL 1: WO 2019/058938 A

SUMMARY OF THE INVENTION

In the power storage module described above, when the negative electrode lead protrudes radially inward of the outer covering can at the time of welding the negative electrode lead to the shoulder portion of the outer covering can, there is a risk that the insulation distance between the negative electrode lead and the sealing body cannot be maintained. On the other hand, when the radial length of the joining region between the negative electrode lead and the outer covering can is reduced in order to maintain the insulation distance between the negative electrode lead and the sealing body, it is difficult to secure a sufficient joining region for joining.

An object of the present disclosure is to provide a power storage module capable of securing a joining region between a negative electrode of a power storage device and a negative electrode lead while securing an insulation distance between a positive electrode of the power storage device and the negative electrode lead.

A power storage module according to one aspect of the present disclosure includes: at least one cylindrical power storage device; and a holder that holds one side of the power storage device; in which a first terminal and a second terminal are disposed at an end portion on one side of the power storage device, in which the second terminal is disposed outside the first terminal in a radial direction of the power storage device, in which the power storage module further includes a lead connected to the second terminal from an outer side in the radial direction, and in which the holder includes a restricting portion located inside at least a part of the lead in the radial direction.

According to one aspect of the present disclosure, contact between the positive electrode of the power storage device and the negative electrode lead can be suppressed.

BRIEF DESCRIPTION OF THE DRAWINGS

FIG. 2 is a detailed view extracting and showing a part A in FIG. 1.

DESCRIPTION OF EMBODIMENT

Hereinafter, an exemplary embodiment of the present disclosure will be described with reference to the drawings. The shapes, materials, and numbers described below are examples, and can be appropriately changed according to the specifications of a power storage module.

Figure 1:
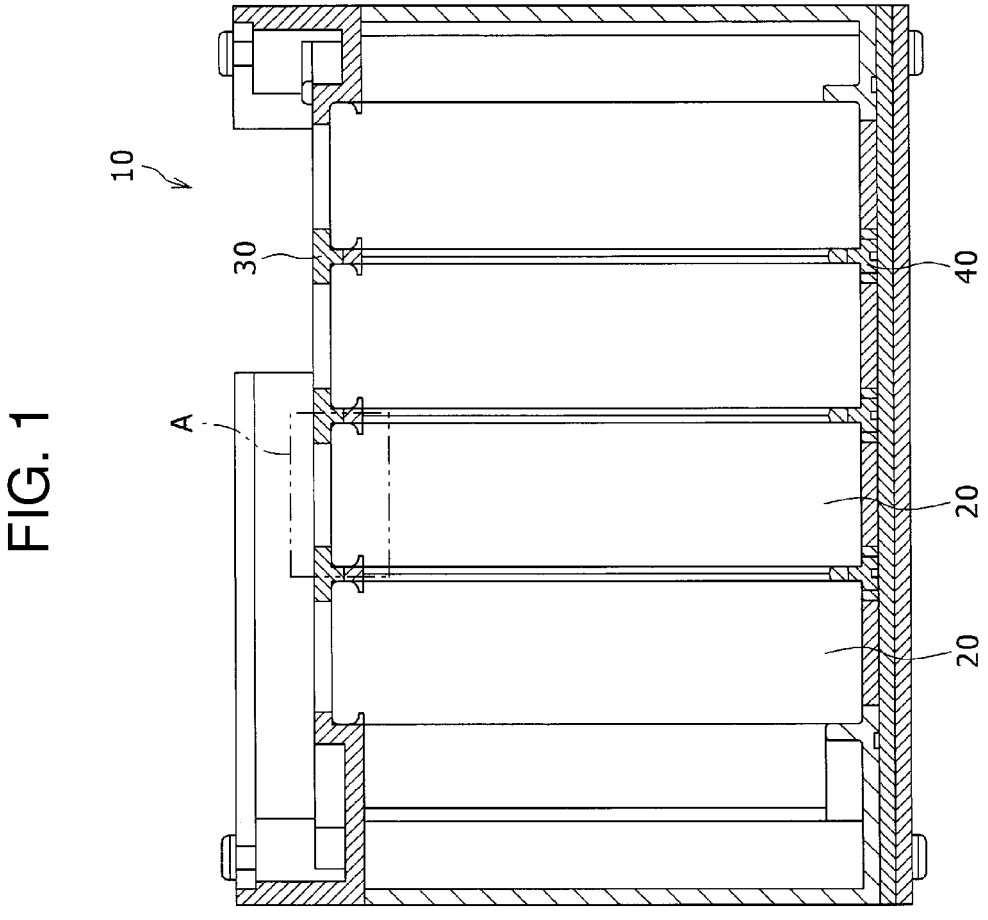
FIG. 1 is a side sectional view showing a power storage module which is an example of an exemplary embodiment.

Power storage module 10 which is an example of the exemplary embodiment will be described with reference to FIG. 1. FIG. 1 is a side sectional view showing power storage module 10. Hereinafter, with respect to power storage module 10 and power storage device 20, a side where upper holder 30 as a holder holds power storage device 20 will be described as an upper side in the vertical direction. However, upper holder 30 side may be a lower side of power storage module 10.

Power storage module 10 is mainly used as a power source for power. Power storage module 10 is used as a power source of an electric device driven by a motor such as an electric car, an electric power tool, an electric power-assisted bicycle, an electric motorcycle, an electric wheelchair, an electric tricycle, or an electric cart. However, the application of power storage module 10 is not limited, and power storage module 10 may be used as a power source of various electric devices used indoors and outdoors, such as a cleaner, a wireless device, a lighting device, a digital camera, and a video camera.

In FIG. 1, power storage module 10 includes a plurality of cylindrical power storage devices 20, upper holder 30 as a holder that holds near upper ends of the plurality of power storage devices 20, a lower holder 40 that holds lower ends of the plurality of power storage devices 20, a first current collector (not shown) in which a positive electrode lead connected to a first terminal (positive-electrode terminal) of power storage device 20 is formed, and a second current collector (not shown) in which negative electrode lead 50 (see FIG. 2) is formed as a lead connected to a second terminal (negative-electrode terminal) of power storage device 20. Details of upper holder 30 and negative electrode lead 50 will be described later.

Figure 2:
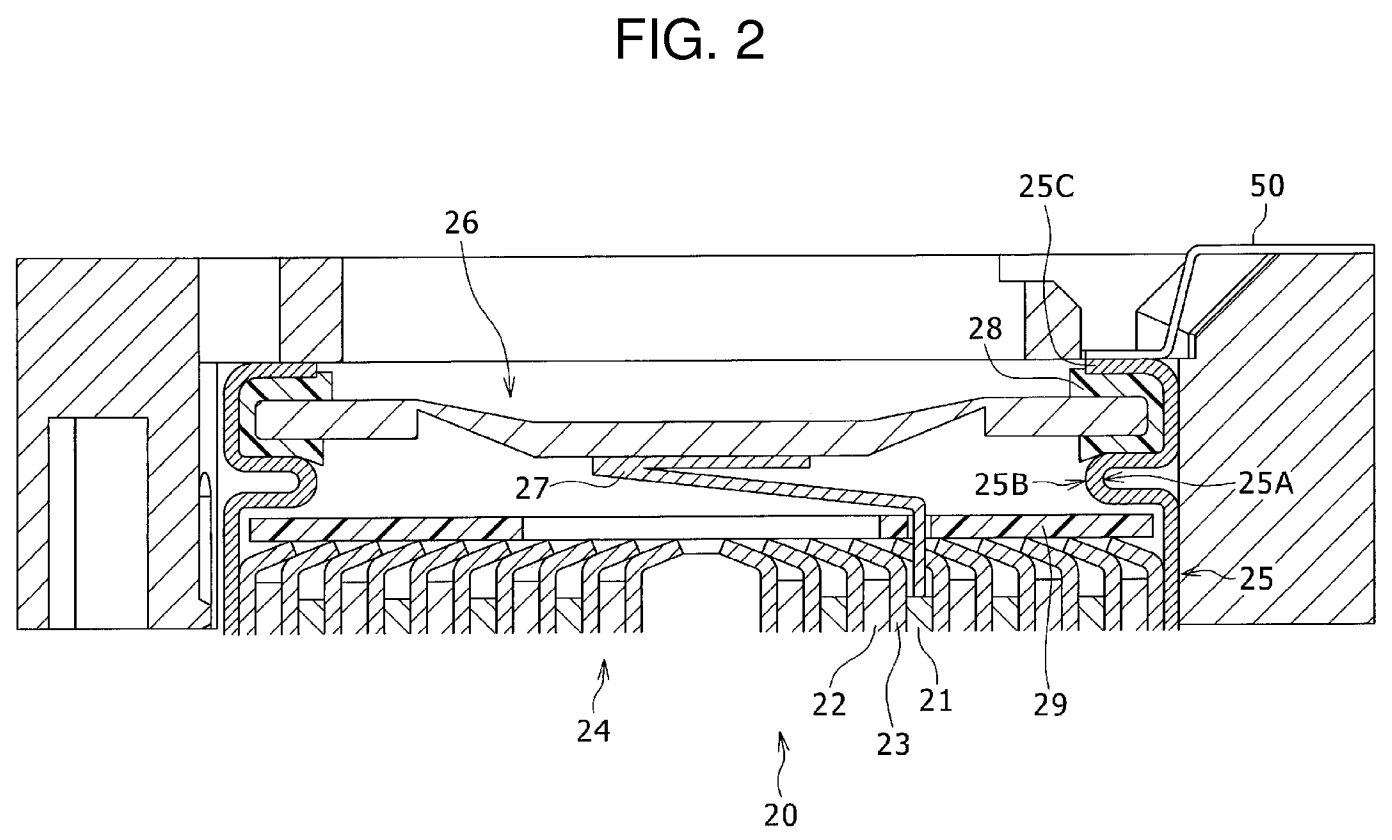

Power storage device 20 will be described with reference to FIG. 2. FIG. 2 is a detailed view of a part A in FIG. 1. Hereinafter, each member will be described in accordance with the radial direction and the circumferential direction of the cylindrical shape of power storage device 20.

As power storage device 20, a cylindrical lithium ion secondary battery is used. Power storage device 20 is not limited to the lithium ion secondary battery, and may be a nickel metal hydride battery, a capacitor, or the like.

Although details will be described later, in power storage device 20, a positive-electrode terminal as a first terminal and a negative-electrode terminal as a second terminal are disposed at an upper end part, and the negative-electrode terminal is disposed radially outside the positive-electrode terminal. More specifically, the positive-electrode terminal is formed on a top surface of sealing body 26 described later. The negative-electrode terminal is formed at a caulked opening end part (hereinafter, shoulder part 25C) of outer covering can 25 described later.

Power storage device 20 includes, for example, electrode group 24 in which strip-shaped positive electrode 21 and strip-shaped negative electrode 22 are wound with strip-shaped separator 23 interposed therebetween, cylindrical outer covering can 25 accommodating electrode group 24 together with an electrolyte solution, sealing body 26 sealing an opening of outer covering can 25 in an insulated state, foil-shaped positive electrode tab 27 electrically connecting positive electrode 21 and sealing body 26, and a negative electrode tab (not shown) electrically connecting negative electrode 22 and outer covering can 25. Insulating gasket 28 is disposed between an outer periphery of sealing body 26 and an inner peripheral surface of the opening of outer covering can 25.

Annular groove part 25A is formed near the opening of the outer peripheral surface of outer covering can 25. In groove part 25A, annular convex part 25B is formed on the inner peripheral surface of corresponding outer covering can 25. Gasket 28 and sealing body 26 are disposed on annular convex part 25B in outer covering can 25. Further, shoulder part 25C of outer covering can 25 is swaged so as to fall down toward the inside of outer covering can 25 in a state where gasket 28 is disposed on the inner peripheral side. Sealing body 26 is vertically sandwiched by swaged shoulder part 25C and convex part 25B with gasket 28 interposed therebetween, whereby the opening of outer covering can 25 is sealed. The shoulder part 25C does not need to have the above configuration. For example, a terminal plate may be provided at a central part of sealing body 26 and a conductive joint may be disposed on an outermost periphery of sealing body 26 in a state of being insulated from the terminal plate, and an opening of outer covering can 25 may be sealed by welding and joining the opening end part and the joint. At this time, negative electrode lead 50 may be connected to the top surface of the joint.

Sealing body 26 may be provided with a current interruption mechanism (CID) or an exhaust valve that ruptures when the inside of outer covering can 25 reaches a predetermined pressure or more. In addition, insulating plate 29 for insulating electrode group 24 from outer covering can 25 may be provided between electrode group 24 and convex part 25B. When insulating plate 29 is provided, positive electrode tab 27 may extend through a through-hole formed in insulating plate 29. Further, an insulating plate for insulating electrode group 24 from outer covering can 25 may be provided between electrode group 24 and the bottom part of outer covering can 25. The negative electrode tab may pass through a through-hole formed in the insulating plate or may extend while bypassing the insulating plate.

In power storage device 20, as described above, the positive-electrode terminal is formed on the top surface of sealing body 26, and the positive electrode lead connected to a positive electrode collector foil is joined. In power storage device 20, as described above, the negative-electrode terminal is formed on swaged shoulder part 25C of outer covering can 25, and the negative electrode tab connected to the negative electrode collector foil is joined to the bottom part of outer covering can 25. Negative electrode lead 50 is joined to shoulder part 25C of outer covering can 25 from the radially outside of power storage device 20.

Figure 3:
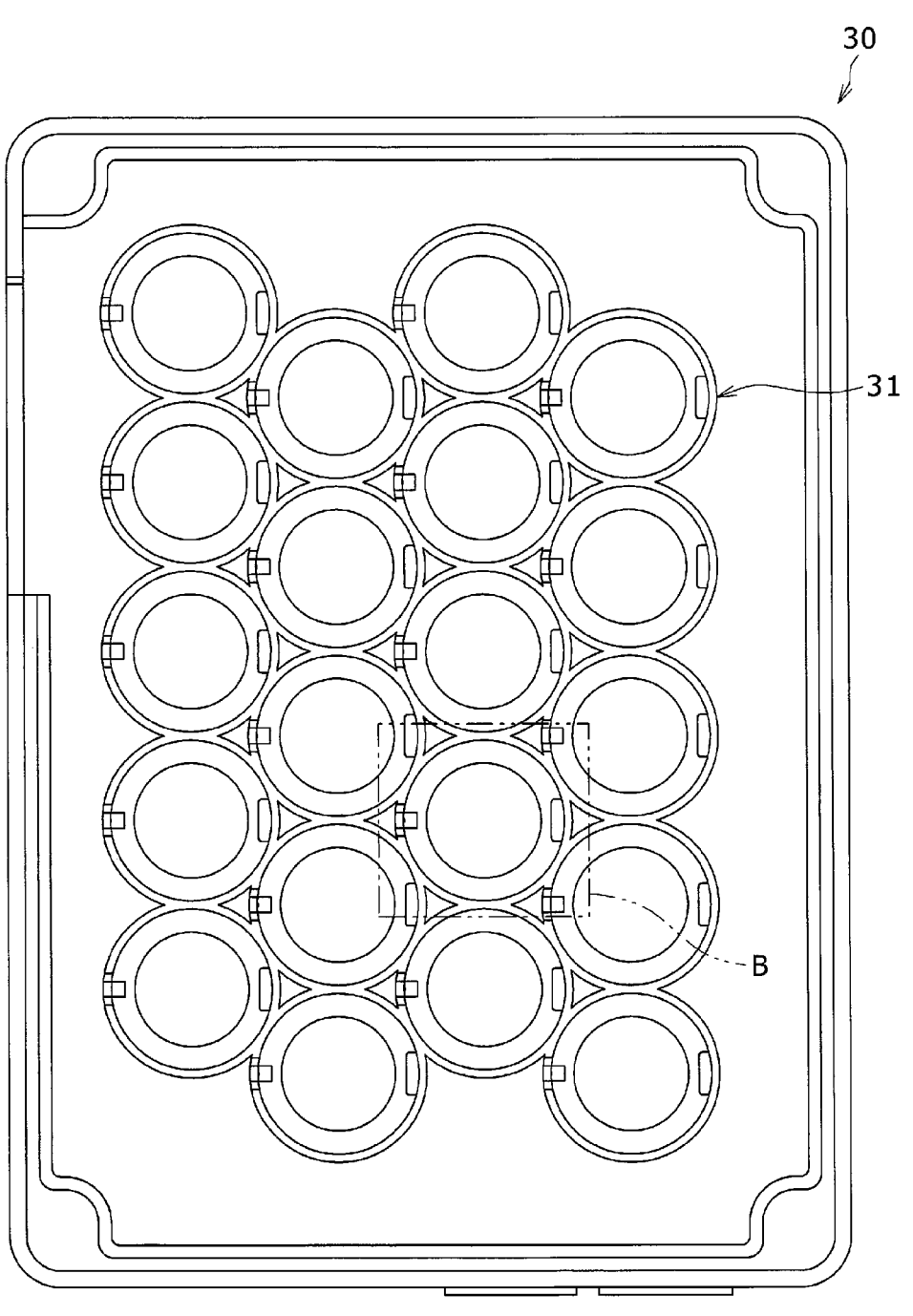
FIG. 3 is a plan view of an upper holder as viewed from below.
Figure 4:
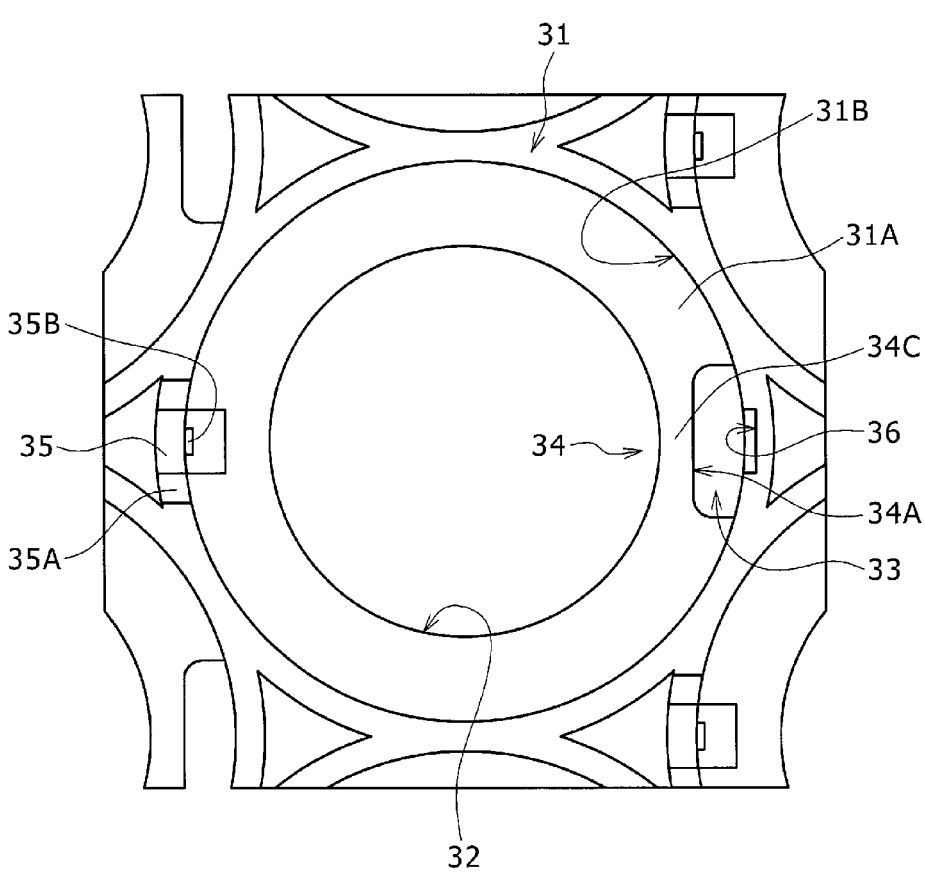
FIG. 4 is a detailed view (plan view) extracting and showing a part B in FIG. 3.
Figure 5:
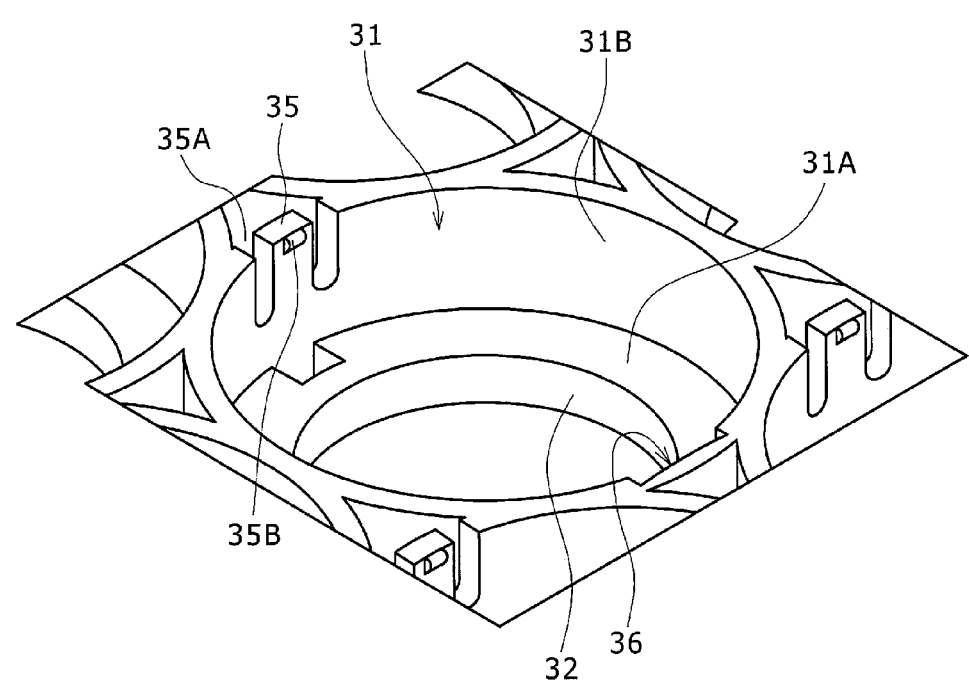
FIG. 5 is a perspective view of a part B in FIG. 4 as viewed from below.
Figure 6:
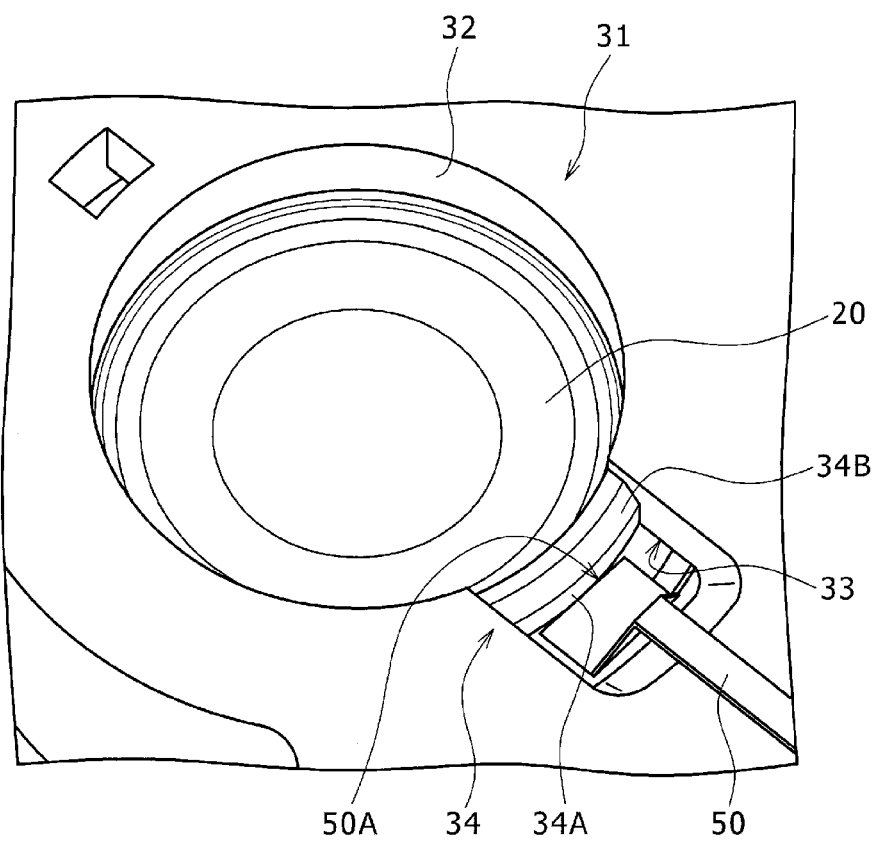
FIG. 6 is a perspective view of a container of the upper holder and a negative electrode lead as viewed from above.
Figure 7:
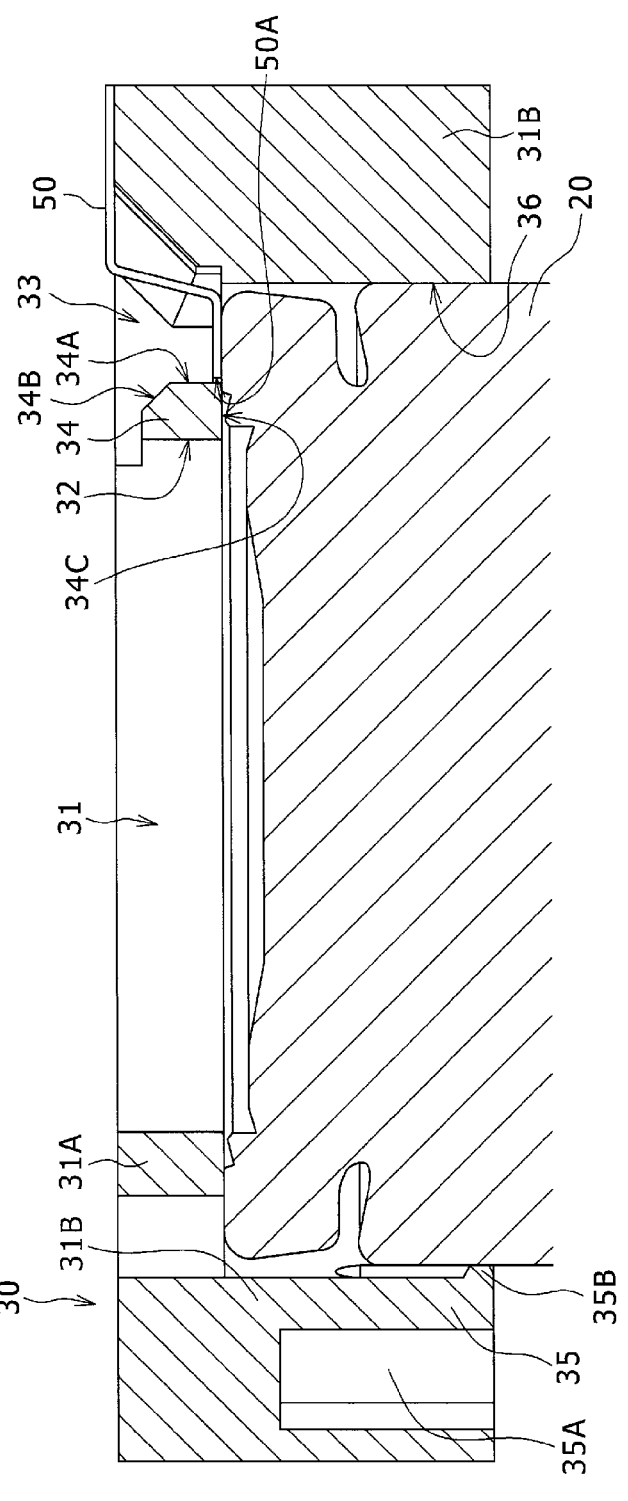
FIG. 7 is a side sectional view of the upper holder.

Upper holder 30 will be described with reference to FIGS. 3 to 7. FIG. 3 is a plan view of upper holder 30 as viewed from below. FIG. 4 is a detailed view (plan view) extracting and showing a part B in FIG. 3. FIG. 5 is a perspective view of a part B in FIG. 4 as viewed from below. FIG. 6 is a perspective view of container 31 of upper holder 30 as viewed from above. FIG. 7 is a side sectional view of upper holder 30.

Upper holder 30 is a member which holds near upper ends of the plurality of power storage devices 20. Upper holder 30 is made of thermoplastic resin. The thermoplastic resin is roughly classified into general-purpose plastics and engineering plastics, and polyethylene, polypropylene, polyamide, ABS, and the like are used. On the top surface of upper holder 30, the first current collector and the second current collector may be arranged side by side in a direction in which the top surface of upper holder 30 expands. The first current collector may have a plurality of positive electrode leads and electrically connect the plurality of power storage devices 20, and the second current collector may have negative electrode leads, be connected to the negative-electrode terminals of the plurality of power storage devices 20, and electrically connect the plurality of power storage devices 20. The first current collector and the second current collector may be stacked on each other with an insulating plate interposed therebetween.

In FIG. 3, a plurality of containers 31 accommodate the vicinity of upper ends of the respective power storage devices 20 are formed on the bottom surface of upper holder 30. The upper end side of power storage device 20 is held by upper holder 30 by fitting the upper end side of power storage device 20 into container 31.

In FIGS. 4 to 7, container 31 is formed on the bottom surface of upper holder 30 as a concave part including ceiling part 31A having a bottom surface facing the upper end surface of power storage device 20 and wall part 31B having an inner peripheral surface facing the side peripheral surface of power storage device 20.

Around container 31, opening part 32 through which the top surface of sealing body 26 of power storage device 20 is exposed from the upper surface of upper holder 30, cutout part 33 through which shoulder part 25C of outer covering can 25 of power storage device 20 is exposed from the upper surface of upper holder 30, and a restricting part 34 located inside at least a part of negative electrode lead 50 in the radial direction of power storage device 20 are formed.

Opening part 32 is a part where ceiling part 31A of container 31 is opened in a circular shape. The diameter of opening part 32 is formed to be smaller than the inner diameter of wall part 31B. According to opening part 32, the top surface of sealing body 26 of power storage device 20 is exposed from the upper surface of upper holder 30. Therefore, the top surface of sealing body 26 and the positive electrode lead can be joined via opening part 32. The bottom part of ceiling part 31A may be in contact with power storage device 20.

Cutout part 33 is a part formed by cutting out a part of an edge part of opening part 32. According to cutout part 33, a part of shoulder part 25C of outer covering can 25 of power storage device 20 can be exposed from the upper surface of upper holder 30. It is preferable that an inclined part which is lowered toward the inside in the radial direction of power storage device 20 is formed on an edge part of cutout part 33 on the upper surface of upper holder 30. As a result, it is possible to reduce the stress applied to the negative electrode lead when negative electrode lead 50 is bent and brought into contact with shoulder part 25C. Therefore, when negative electrode lead 50 is joined to shoulder part 25C of outer covering can 25, a joining tool, a jig, or the like can be brought close to negative electrode lead 50 to improve workability. In addition, the top surface of restricting part 34 may be at a position lower than the top surface of the region of upper holder 30 where cutout part 33 is formed. With this configuration, negative electrode lead 50 can be more easily accommodated in cutout part 33.

As described above, restricting part 34 is a part located inside at least a part of negative electrode lead 50 in the radial direction of power storage device 20. In other words, restricting part 34 is a part that restricts negative electrode lead 50 so as not to move inward from the predetermined position in the radial direction. The predetermined position is preferably an inner end position in the radial direction of shoulder part 25C of outer covering can 25 of power storage device 20 (an opening end position of outer covering can 25). However, in the present invention, all of negative electrode leads 50 may not be located at shoulder part 25C (outside the top surface of the sealing body) due to the above-described restricting part 34. A part of negative electrode lead 50 may overlap the top surface of the sealing body without being in contact with the top surface. It goes without saying that negative electrode lead 50 is accommodated in a window formed by restricting part 34 and cutout part 33.

Restricting part 34 is located on the radially inner side of cutout part 33 and is formed so as to be bridged over surfaces (parts of ceiling part 31A connected to both ends of cutout part 33) on both sides in the circumferential direction of cutout part 33. Negative electrode lead 50 may be joined to shoulder part 25C of outer covering can 25 in a state where outer surface 34A of restricting part 34 and negative electrode lead 50 are in contact with each other or slightly separated from each other in the radial direction of power storage device 20.

According to restricting part 34, by restricting negative electrode lead 50 so as to be located outside the predetermined position in the radial direction, it is possible to secure an insulation distance between the top surface (positive-electrode terminal) of sealing body 26 of power storage device 20 and negative electrode lead 50. In addition, when conductive foreign matter enters from the outside of upper holder 30, it is possible to reduce the risk of a short circuit between the top surface of sealing body 26 and negative electrode lead 50 due to the foreign matter or the like.

Furthermore, according to restricting part 34, since the insulation distance from the top surface of sealing body 26 can be secured, it is not necessary to reduce the radial length of negative electrode lead 50 in consideration of the insulation distance from the top surface of sealing body 26, and the radial length of negative electrode lead 50 can be sufficiently increased. With such a configuration, a joining region between negative electrode lead 50 and shoulder part 25C (negative-electrode terminal) of outer covering can 25 of power storage device 20 can be secured.

Restricting part 34 has inclined part 34B which is formed from the upper surface toward outer surface 34A, falls in the radial direction of power storage device 20, and is lowered toward the outside. Due to inclined part 34B, when negative electrode lead 50 is brought into contact with shoulder part 25C in order to join negative electrode lead 50 to shoulder part 25C of outer covering can 25, negative electrode lead 50 can be easily accommodated in cutout part 33 using a joining tool, a jig, or the like.

Restricting part 34 may have bottom surface 34C, and bottom surface 34C may be in contact with power storage device 20. With such a configuration, it is possible to prevent negative electrode lead 50 or foreign matter from getting into a space below restricting part 34, that is, a gap formed between power storage device 20 and restricting part 34. Bottom surface 34C may be in contact with shoulder part 25C. With such a configuration, in power storage device 20, a region exposed from the inside of cutout part 33 is formed only on shoulder part 25C. Therefore, the short circuit of negative electrode lead 50 can be further suppressed as compared with the configuration in which restricting part 34 is located inside shoulder part 25C in the radial direction of power storage device 20.

In FIGS. 4 to 7, pressing part 35 which presses the side peripheral surface of power storage device 20 toward the side where restricting part 34 is formed and support part 36 which supports the side peripheral surface of power storage device 20 are formed on wall part 31B of container 31.

According to pressing part 35 and support part 36, in container 31 of upper holder 30, power storage device 20 is pushed to the side where support part 36 in the radial direction is formed, and dimensional variations of upper holder 30 and power storage device 20 in the radial direction and relative positional displacement between upper holder 30 and power storage device 20 are absorbed, so that power storage device 20 can be unevenly distributed in the direction in which pressing part 35 presses. Therefore, it is possible to suppress that shoulder part 25C is not sufficiently exposed from the window defined by cutout part 33 and restricting part 34 due to dimensional tolerance and assembly tolerance of power storage device 20 and upper holder 30. Then, it is possible to suppress the joining failure between shoulder part 25C and negative electrode lead 50 due to the insufficient exposure amount. The variation in the exposure amount of shoulder part 25C from cutout part 33 can be suppressed by only pressing part 35 without support part 36 as compared with the configuration without pressing part 35.

Pressing part 35 is a part which presses the side peripheral surface of outer covering can 25 of power storage device 20 toward the side where restricting part 34 is formed in the circumferential direction at a position facing restricting part 34 in the circumferential direction. According to pressing part 35, power storage device 20 is pressed against the side where restricting part 34 and support part 36 are formed in the radial direction. Therefore, pressing part 35 and restricting part 34 may be disposed on opposite sides to each other with power storage device 20 interposed therebetween. However, as long as the pressing force is generated toward restricting part 34, pressing part 35 does not necessarily need to be at a symmetrical position with respect to the central axis of upper holder 30.

Pressing part 35 is formed to extend downward from the ceiling surface of concave part 35A formed at the edge part of wall part 31B of container 31. Therefore, pressing part 35 is located in concave part 35A or adjacent to concave part 35A. With such a configuration, it is easy to integrally mold the pressing part formed on upper holder 30. Further, on the upper surface of upper holder 30, a through-hole may be formed at a position most adjacent to pressing part 35 in plan view of upper holder 30. This through-hole facilitates integral molding when pressing part 35 is molded using a mold. The distal end part of pressing part 35 has convex part 35B protruding inward in the radial direction of power storage device 20. Convex part 35B is formed to protrude radially inward from wall part 31B of container 31 in plan view. Further, a plurality of pressing parts 35 may be provided for one container 31.

Support part 36 is a part which supports the side peripheral surface of outer covering can 25 of power storage device 20 at substantially the same position as restricting part 34 in the circumferential direction. Support part 36 is formed in a groove shape in the vertical direction in wall part 31B of container 31. In support part 36, the groove-shaped opening edge part of wall part 31B of container 31 is in contact with the side peripheral surface of power storage device 20 to support the side peripheral surface of outer covering can 25 of power storage device 20. At this time, in wall part 31B, the inner peripheral surface facing power storage device 20 and the side peripheral surface of power storage device 20 may have different curvatures. Due to this difference in curvature, the part of power storage device 20 accommodated in support part 36 can be more reliably brought into contact with the opening edge part. As a method of making the curvatures different from each other, for example, the diameter of the inner peripheral surface of wall part 31B and the diameter of the side peripheral surface of power storage device 20 can be made different from each other.

Support part 36 is not limited to a groove shape in the vertical direction. For example, support part 36 may be formed as a protrusion such as two ribs formed in the vertical direction while being formed to protrude inward from wall part 31B of container 31. In this case, the respective protrusions are in contact with the side peripheral surface of power storage device 20 to support the side peripheral surface of outer covering can 25 of power storage device 20. Further, the support parts 36 may be provided at a plurality of positions on wall part 31B. Further, the support parts 36 may not be disposed at substantially the same position in the circumferential direction of the power storage device. In the circumferential direction, the support parts 36 may be separated from each other.

Figure 8:
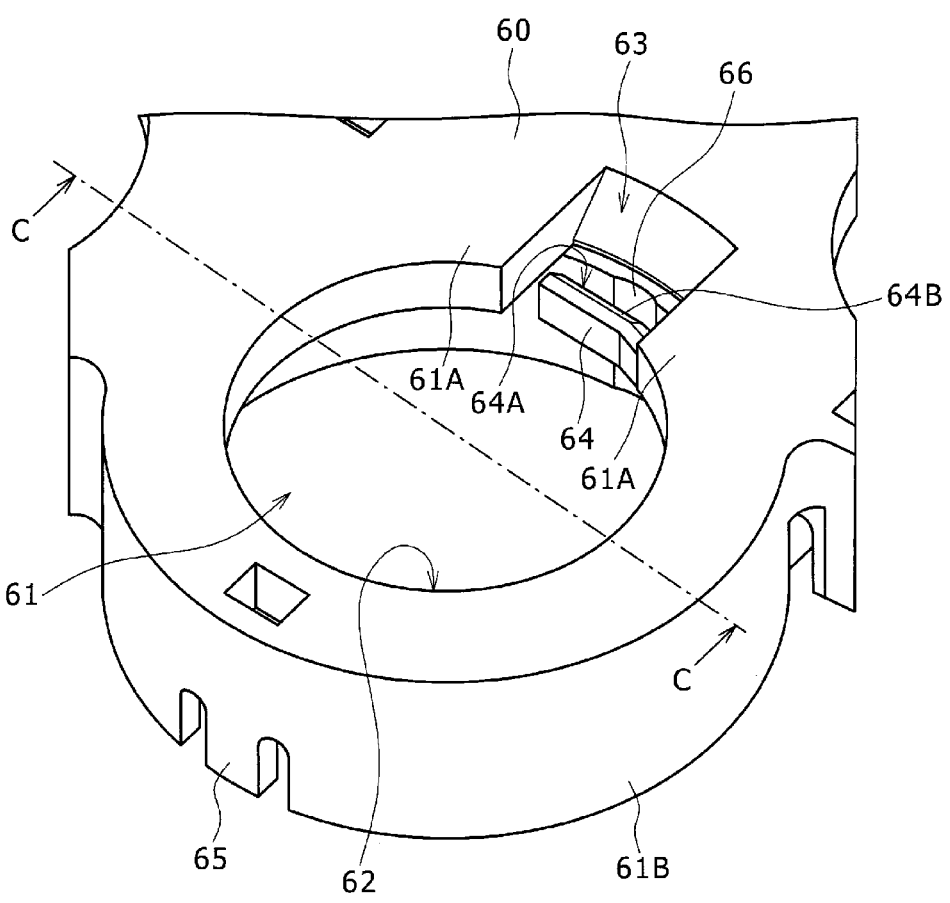
FIG. 8 is a perspective view of an upper holder of a power storage module which is another example of the exemplary embodiment as viewed from above.
Figure 9:
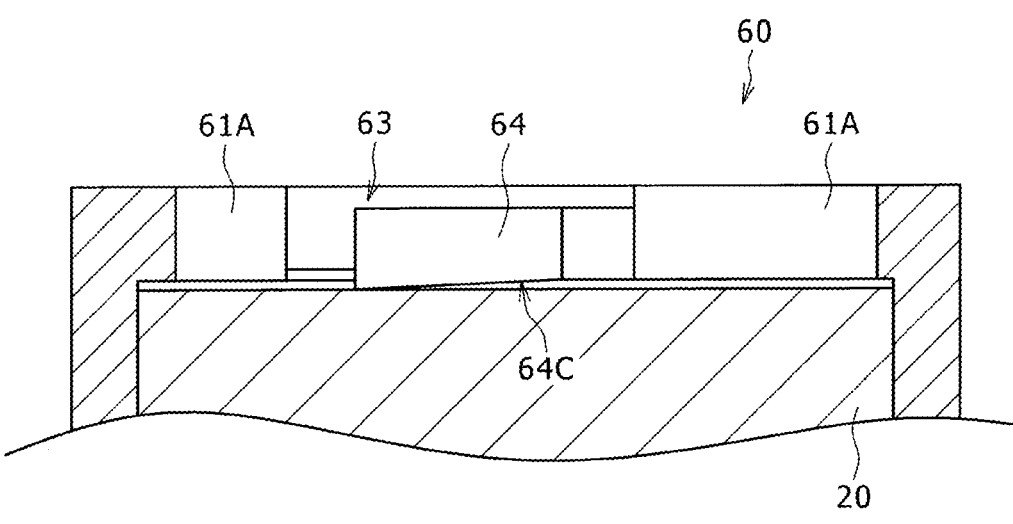
FIG. 9 is a sectional view taken along line CC in FIG. 7.

Upper holder 60 of power storage module 10 which is another example of the exemplary embodiment will be described with reference to FIGS. 8 and 9. FIG. 8 is a perspective view of container 61 of upper holder 60 as viewed from above. FIG. 9 is a sectional view taken along line DD in FIG. 7. In FIG. 9, the shape of power storage device 20 is omitted.

As described above, upper holder 30 is a member which holds near the upper ends of the plurality of power storage devices 20. Since upper holder 60 has the same configuration as upper holder 30 described above except for restricting part 64, only restricting part 64 will be described below. Specifically, container 61, opening part 62, cutout part 63, pressing part 65, and support part 66 formed in upper holder 60 have the same configurations as those of container 31, opening part 32, cutout part 33, pressing part 35, and support part 36 formed in upper holder 30 described above.

Restricting part 64 is located inside at least a part of negative electrode lead 50 in the radial direction of power storage device 20. In other words, restricting part 64 regulates negative electrode lead 50 so as not to move inward from a predetermined position in the radial direction. The predetermined position is preferably an inner end position in the radial direction of shoulder part 25C of outer covering can 25 of power storage device 20 (an opening end position of outer covering can 25).

In FIGS. 8 and 9, restricting part 64 is formed to extend from one ceiling part 61A forming cutout part 63 on the radially inner side of cutout part 63. In other words, restricting part 64 is formed in cutout part 63 as a cantilever having the distal end part as a free end. A gap between the distal end part of restricting part 64 and other ceiling part 61A is preferably smaller than the length of restricting part 64.

Negative electrode lead 50 electrode lead may be joined to shoulder part 25C of outer covering can 25 in a state where outer surface 64A of restricting part 64 and distal end part 50A (see FIG. 6) of negative electrode lead 50 are in contact with each other or slightly separated from each other in the radial direction of power storage device 20.

According to restricting part 64, similarly to restricting part 34 described above, an insulation distance between the top surface (positive electrode) of sealing body 26 of power storage device 20 and negative electrode lead 50 can be secured, and a joining region between negative electrode lead 50 and shoulder part 25C (negative electrode) of outer covering can 25 of power storage device 20 can be secured.

Restricting part 64 has inclined part 64B formed from the upper surface toward outer surface 64A. As a result, negative electrode lead 50 can be easily accommodated in cutout part 33 using a joining tool, a jig, or the like at the time of joining negative electrode lead 50 to shoulder part 25C of outer covering can 25.

Restricting part 64 has bottom surface 64C inclined downward toward the distal end. Restricting part 64 is formed such that the position in the vertical direction of bottom surface 64C near the distal end of restricting part 64 is located below the position in the vertical direction of ceiling part 61A. Accordingly, restricting part 64 is positively brought into contact with the top surface of power storage device 20. Therefore, it is possible to prevent negative electrode lead 50 from getting between restricting part 64 and power storage device 20 by restricting part 64.

For example, when a gap is generated between power storage device 20 and ceiling part 61A of upper holder 60 due to a dimensional tolerance of a shape of power storage device 20 or upper holder 60 or a relative positional deviation between power storage device 20 and upper holder 60 due to an assembly tolerance, since the position in the vertical direction of bottom surface 64C on the distal end side of restricting part 64 is located below the position in the vertical direction of ceiling part 61A, it is possible to prevent bottom surface 64C of restricting part 64 from coming into contact with power storage device 20 and negative electrode lead 50 from getting under restricting part 64.

On the other hand, when no gap is generated between power storage device 20 and ceiling part 61A of upper holder 60, since restricting part 64 is formed to extend from one ceiling part 61A, the distal end side of restricting part 64 is slightly bent upward, and it is possible to prevent bottom surface 64C of restricting part 64 from coming into contact with power storage device 20 and negative electrode lead 50 from getting under restricting part 64. In restricting part 64, bottom surface 64C on the distal end part side protrudes downward. However, bottom surface 64C on the root side of restricting part 64 may protrude downward. Further, as long as restricting part 64 is bent, entire bottom surface 64C of restricting part 64 may protrude without being biased toward the distal end side or the root side. Further, as long as restricting part 64 is bent, restricting part 64 may not have a cantilever shape but may have a shape in which both ends are supported.

Figure 10:
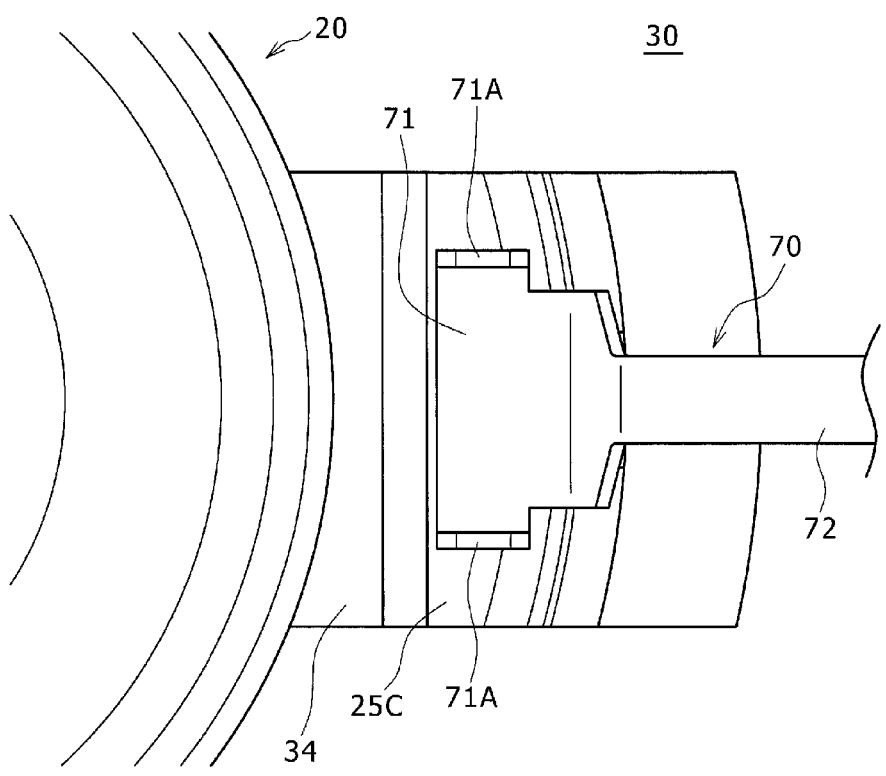
FIG. 10 is a plan view showing a negative electrode lead of a power storage module which is another example of the exemplary embodiment.
Figure 11:
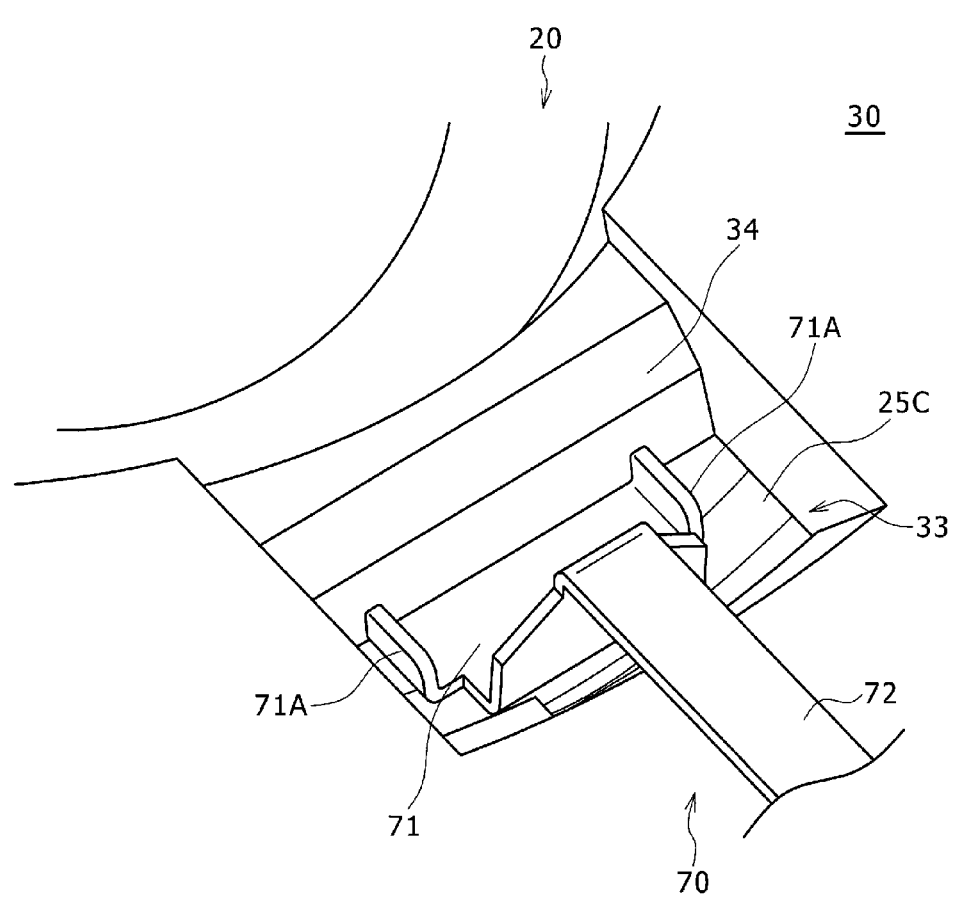
FIG. 11 is a perspective view of FIG. 10.

Negative electrode lead 70 of power storage module 10 which is another example of the exemplary embodiment will be described with reference to FIGS. 10 and 11. FIG. 10 is a plan view showing negative electrode lead 70. FIG. 11 is a perspective view of FIG. 10.

As described above, negative electrode lead 70 is a part connected to shoulder part 25C (negative-electrode terminal) of outer covering can 25 of power storage device 20 exposed from cutout part 33 of upper holder 30. Negative electrode lead 70 can be applied to either power storage module 10 having upper holder 30 or power storage module 10 having upper holder 60, but an example applied to power storage module 10 having upper holder 30 will be described below.

In FIGS. 10 and 11, negative electrode lead 70 includes joint 71 joined to shoulder part 25C (negative-electrode terminal) of outer covering can 25 of power storage device 20, and connecting part 72 that connects joint 71 to a body (not shown) of the second current collector. Joint 71 includes wall parts 71A formed in an erected manner at both end parts in a circumferential direction (in a broad sense, a direction intersecting the radial direction) of power storage device 20. Wall part 71A is formed by, for example, bending. Wall part 71A may be formed by joining separate members to both circumferential end parts of the connecting part 72. The size of wall part 71A in the vertical direction may be lower than the height protruding from cutout part 33 on the top surface of upper holder 60. Even if the size of wall part 71A in the vertical direction is smaller than the gap between power storage device 20 and restricting part 64, the possibility of entering the gap can be reduced compared to the joint where wall part 71A does not exist. In addition, when the size of wall part 71A in the vertical direction is larger than the gap, the possibility of entering the gap more significantly can be reduced.

For example, even when a gap is generated between power storage device 20 and ceiling part 31A of upper holder 30 due to a dimensional tolerance of a shape of power storage device 20 or upper holder 30 or a relative positional deviation due to an assembly tolerance between power storage device 20 and upper holder 30, it is possible to prevent negative electrode lead 70 from getting into the gap since the size (height) in the vertical direction of negative electrode lead 70 is increased by wall part 71A.

On the other hand, it is also conceivable to form a wall part at the distal end part of joint 71 by bending a distal end part (inner end side in the radial direction) of joint 71. However, in a case where a positive electrode current collecting foil including a positive electrode lead and a negative electrode current collecting foil including negative electrode lead 70 are produced from one metal foil by punching, the distal end part of joint 71 of negative electrode lead 70 and the distal end part of the positive electrode lead are often close to each other in the metal foil before punching. In such a case, it may be difficult to form the wall part at the distal end part of joint 71.

Therefore, by forming wall part 71A by bending at least one end of joint 71 in the circumferential direction (in a broad sense, a direction intersecting the radial direction), it is possible to prevent negative electrode lead 70 from getting under restricting part 34.

Note that the present invention is not limited to the above-described exemplary embodiments and modified examples thereof, and it is a matter of course that various changes and improvements can be made within the scope of the matters described in the claims of the present application.

REFERENCE MARKS IN THE DRAWINGS

10 power storage module
20 power storage device
21 positive electrode
22 negative electrode
23 separator
24 electrode group
25 outer covering can
25A groove part
25B convex part
25C shoulder part
26 sealing body
27 positive electrode tab
28 gasket
29 insulating plate
30 upper holder
31 container
31A ceiling part
31B wall part
32 opening part
33 cutout part
34 restricting part
34A outer surface
34B inclined part
34C bottom surface
35 pressing part
35A concave part
35B convex part
36 support part
40 lower holder
50 negative electrode lead
50A distal end part
60 upper holder
61A ceiling part
63 cutout part
64 restricting part
64A outer surface
64B inclined part
64C bottom surface
70 negative electrode lead
71 joint
71A wall part
72 connecting part

The invention claimed is:

1. A power storage module comprising:
at least one power storage device that is cylindrical; and
a holder that holds one side of each of the at least one power storage device, wherein:
the at least one electricity storage device each includes a first terminal and a second terminal on an end part of the one side,
the second terminal positioned more outside than the first terminal in a radial direction of the at least one electricity storage device,
the power storage module further comprises a lead extending from an outside of the at least one electricity storage device in the radial direction and connected to the second terminal,
the holder includes a restriction part positioned more inside than a first part of the lead in the radial direction, a second part of the lead is disposed on a position of the holder different from the first part of the lead in a height direction of the power storage device, the lead further comprises a third part between the first part and the second part of the lead in an extending direction of the lead, the third part of the lead extends in the height direction of the power storage device and bends from the first portion and the second portion, and a bending portion between the second portion and the third portion extends a crossing direction with the radial direction.

2. The power storage module according to claim 1, wherein the holder includes an opening part for exposing the first terminal, and a cut-out section disposed in a surrounding of the opening part and exposing the second terminal, and both ends of the restricting part are connected to the cutout part.

3. The power storage module according to claim 2, wherein a top surface of the restricting part is located lower than the position where the second portion of the lead is located of the holder.

4. The power storage module according to claim 1, wherein the holder includes a pressing part that is provided at a side of the holder opposite to a side of the holder where the restriction part is provide and presses a side peripheral surface of the at least one power storage device toward the side where the restricting part is provided.

5. The power storage module according to claim 4, wherein the pressing part includes a convex part that is brought into contact with the side peripheral surface of the at least one power storage device.

6. The power storage module according to claim 4, wherein the pressing part is positioned in a concave part disposed in a wall part of a container of the holder that accommodates the at least one power storage device or is adjacent to the concave part.

7. The power storage module according to claim 4, wherein the holder further includes a support part that supports the side peripheral surface of the at least one power storage device.

8. The power storage module according to claim 7, wherein the support part is a groove part disposed on a surface of the holder facing the side peripheral surface of the at least one power storage device.

9. The power storage module according to claim 1, wherein a bottom part of the restricting part and the second terminal are in contact with each other.

10. The power storage module according to claim 1, further comprising an inclined part extending from a top surface of the restricting part to the position where the second portion of the lead is located.

11. The power storage module according to claim 1, wherein each of the at least one power storage device includes an electrode body including a first electrode and a second electrode, an outer covering can that accommodates the electrode body together with an electrolyte, and includes a tubular part that is cylindrical and an opening at one end of the tubular part, and a sealing body that closes the opening at the one end of the outer covering can together with a gasket insulating, the sealing body is electrically connected to the first electrode, the outer covering can is electrically connected to the second electrode, one end part of the outer covering can is bent inward in a radial direction of the outer covering can and is in contact with an outer peripheral edge of the sealing body via the gasket, the first terminal is the sealing body, and the second terminal is one end part of the outer covering can.

12. A power storage module comprising:

at least one power storage device that is cylindrical; and a holder that holds one side of each of the at least one power storage device, wherein:

the at least one electricity storage device each includes a first terminal and a second terminal on an end part of the one side, the second terminal is positioned more outside than the first terminal in a radial direction of the at least one electricity storage device, the power storage module further comprises a lead connected to the second terminal from the outside in the radial direction, the holder includes a restriction part positioned more inside than at least a part of the lead in the radial direction, and the power storage module further comprises an inclined part extending from a top surface of the restricting part to an outer surface.

*    *    *    *    *